(12) United States Patent
Müller et al.

(10) Patent No.: US 7,242,168 B2
(45) Date of Patent: Jul. 10, 2007

(54) WIDE INPUT RANGE BUCK/BOOST SWITCHING REGULATOR

(75) Inventors: Axel Müller, Babenhausen (DE); Antonio Romero-Lobato, Schaafheim (DE)

(73) Assignee: Siemens Aktiengesellschaft, München (DE)

( * ) Notice: Subject to any disclaimer, the term of this patent is extended or adjusted under 35 U.S.C. 154(b) by 229 days.

(21) Appl. No.: 10/753,938

(22) Filed: Jan. 8, 2004

(65) Prior Publication Data

US 2004/0207373 A1 Oct. 21, 2004

(30) Foreign Application Priority Data

Jan. 8, 2003 (EP) .................................. 03000278

(51) Int. Cl.
*G05F 1/59* (2006.01)
(52) U.S. Cl. ...................... 323/222; 323/225; 323/271; 323/285; 323/299
(58) Field of Classification Search ................ 323/222, 323/224, 225, 271, 284, 285, 299
See application file for complete search history.

(56) References Cited

U.S. PATENT DOCUMENTS

| | | | | |
|---|---|---|---|---|
| 4,814,685 A * | 3/1989 | Renger | ........................ | 323/224 |
| 4,958,121 A * | 9/1990 | Cuomo et al. | ............... | 323/224 |
| 4,967,138 A * | 10/1990 | Obergfell et al. | ........... | 323/224 |
| 4,974,141 A * | 11/1990 | Severinsky et al. | ............ | 363/81 |
| 5,402,060 A * | 3/1995 | Erisman | ..................... | 323/268 |
| 5,602,463 A * | 2/1997 | Bendall et al. | ............. | 323/266 |
| 5,734,258 A | 3/1998 | Esser | | |
| 5,831,418 A * | 11/1998 | Kitagawa | .................... | 323/222 |
| 6,037,755 A * | 3/2000 | Mao et al. | ................... | 323/222 |
| 6,166,527 A * | 12/2000 | Dwelley et al. | ............ | 323/222 |
| 6,275,016 B1 * | 8/2001 | Ivanov | ........................ | 323/224 |
| 6,320,358 B2 * | 11/2001 | Miller | ........................ | 323/222 |
| 6,348,779 B1 * | 2/2002 | Sluijs | ......................... | 323/222 |
| 6,348,781 B1 * | 2/2002 | Midya et al. | ................ | 323/224 |
| 6,636,431 B2 * | 10/2003 | Seki et al. | .................... | 363/65 |
| 6,765,371 B2 * | 7/2004 | Kataoka | ...................... | 323/222 |
| 6,788,033 B2 * | 9/2004 | Vinciarelli | ................... | 323/225 |
| 6,812,676 B2 * | 11/2004 | Tateishi | ...................... | 323/225 |
| 6,977,488 B1 * | 12/2005 | Nogawa et al. | ............ | 323/271 |
| 6,984,967 B2 * | 1/2006 | Notman | ...................... | 323/282 |

FOREIGN PATENT DOCUMENTS

EP 1 211 791 A1 6/2002

* cited by examiner

*Primary Examiner*—Jeffrey Sterrett
(74) *Attorney, Agent, or Firm*—Cohen Pontani Lieberman & Pavane LLP

(57) ABSTRACT

A low-cost, wide input range, DC-DC voltage-switching converter regulator device for supplying power to various components in an automotive application includes two pairs of serialized switch elements for controlling separate Boost and Buck Modes each through a respective one of said pairs. In particular, the converter regulator device is arranged for under control of a driving voltage below a first threshold voltage outputting a negligible output current, in a Buck-Mode under control of a driving voltage above a second threshold voltage outputting a Buck-Mode flat current level through alternating and mutually opposing conducting states of the first switch elements, and in a Boost-Mode under control of a driving voltage between the first and second thresholds outputting a Boost-Mode flat current level that is substantially lower than the Buck-Mode current level through driving via the inductor a medial tap of serialized second switch elements of which one terminal tap constitutes an output terminal of the converter.

15 Claims, 12 Drawing Sheets

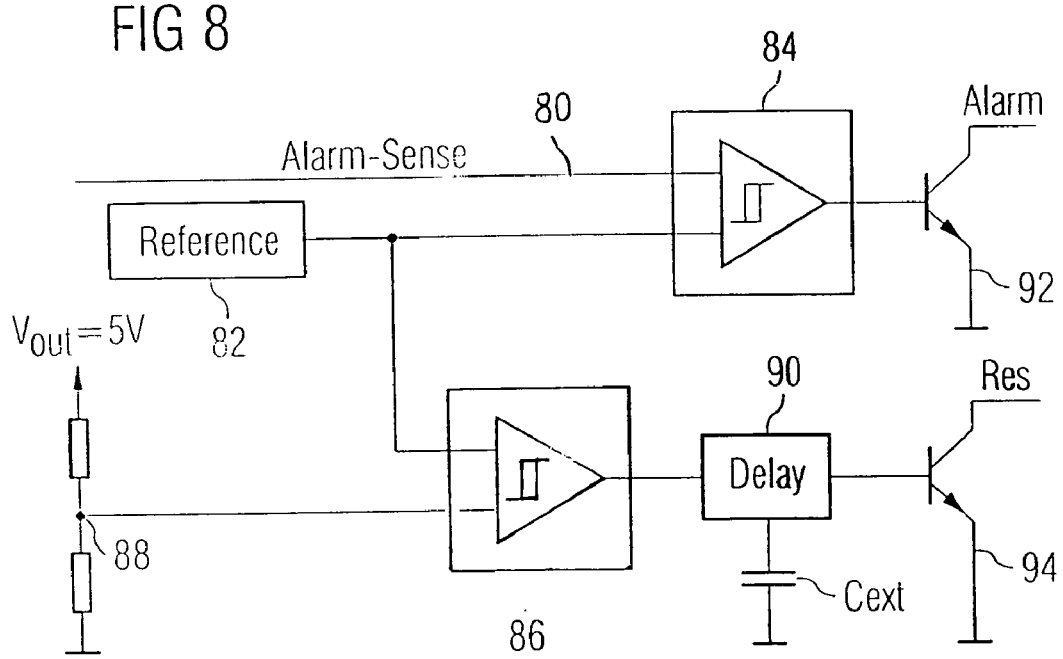

TABLE 1

Supply

| Electrical Parameter | Min. | Typ. | Max. | Unit |
|---|---|---|---|---|
| VI Logic Input Voltage (Vin) | 3 | | 42 | V |
| $V_{DRIVER}$ | 2 | | 42 | V |
| Startup Condition: $V_{DRIVER}=$ (Iout=600 mA) | | | 5 | V |
| Softstart Ramp (Cout, min=36 µF: Cout,max=770 µF) (Softstart after every reset without external softsart Cap) | 2 | | 20 | V/ms |
| Quiescent Current | | 150 | 200 | µA |
| Standby Current (Enable=Low or open) | | 10 | 20 | µA |
| Output Voltage (Vout) | 4.9 | 5 | 5.1 | V |
| Output Voltage Tolerance | | | 2 | % |
| Output Voltage Tolerance (Boost/Buck crossover) | | | 1 | % |
| Average Output Current ($V_{DRIVER} \geq 5V$) | 600 | - | - | mA |
| Average Output Current (BOOST-Mode, $V_{DRIVER}=2V-5V$) | 200 | - | - | mA |
| Peak Current | TBD | 2000 | TBD | mA |

TABLE 2  5V Output Switch (5Vg)

| Electrical Parameter | Min. | Typ. | Max. | Unit |
|---|---|---|---|---|
| Rds, on | | | 200 | mΩ |
| Output Current | 400 | | | mA |
| 5Vg-Enable | -0.5 | | Vout | V |
| 5Vg-Enable Threshold High (5Vg=5V) | | 3 | 3.5 | V |
| 5Vg-Enable Threshold Low (5Vg=0V) | 0.8 | | | V |
| Hysteresis | - | 1 | - | V |

TABLE 3  Enable

| Electrical Parameter | Min. | Typ. | Max. | Unit |
|---|---|---|---|---|
| Enable Input Voltage High | | | 42 | V |
| Enable Input Voltage Low | -0.5 | | | V |
| Enable Threshold (Vout=5V) | | 3 | 3.5 | V |
| Enable Threshold (Vout=0V) | 0.8 | | | V |
| Hysteresis | | 1 | | V |

TABLE 4  Reset

| Electrical Parameter | Min. | Typ. | Max. | Unit |
|---|---|---|---|---|
| Reset Tolerance | | | 3 | % |
| Reset Threshold | 4.51 | 4.65 | 4.79 | V |
| Reset Time ($C_{REST}=10nF$) | 8 | 10 | 12 | ms |
| Reset Time ($C_{REST}=100nF$) | 80 | 100 | 120 | ms |
| Reset Output Voltage Low @$I_{sink}=5$ mA | | | 0.4 | V |
| Reset Deglitch | | | 5 | ms |

TABLE 5  Alarm

| Electrical Parameter | Min. | Typ. | Max. | Unit |
|---|---|---|---|---|
| Alarm in Voltage High | | | 42 | V |
| Alarm in Voltage Low | -0.5 | | | V |
| Alarm Tolerance | | | 3 | % |
| Alarm Threshold ($A_{IN}$) | 2.3 | 2.4 | 2.5 | V |
| Alarm Output Voltage Low @ $I_{sink}=5$ mA | | | 0.4 | V |
| Alarm Hysteresis ($A_{IN}=ALARM_{REF}$) | 140 | 170 | 200 | mV |

WIDE INPUT RANGE BUCK/BOOST SWITCHING REGULATOR

BACKGROUND OF THE INVENTION

1. Field of the Invention

The present invention relates to a wide input range, DC-DC voltage-switching converter regulator device for supplying power to various components in an automotive application, the device including two pairs of serialized switch elements for controlling separate Boost and Buck Modes each through a respective one of said pairs of switch elements.

2. Description of the Related Art

Low-cost DC-DC voltage-switching converter regulator device for supplying power to various components in an automotive application may include a driving input terminal for receiving electric power and for feeding first switch elements connected in series. A medial tap is arranged for feeding an external inductor which feeds a power output terminal. Switching regulators have been designed for many applications wherein low voltage powering is required for solid state elements and other devices. The inventors of the present invention have recognized the need for a low-cost solution that would furthermore be immune against interference from the start voltage surge that could be a nuisance in automotive electronics. In particular, the inventive apparatus should be able to function without the necessity for an external switching transistor or a free-running diode.

The inventors have further recognized that during the receipt of a relatively low driving voltage generally no start functionality of the vehicle would be relevant, and that distinct output current level including a negligible value, a Boost-Mode value, and a Buck-Mode value (and an eventually optional Buck-Boost-Mode for proper transition from Buck to Boost) would represent respective operational modes.

SUMMARY OF THE INVENTION

It is an object of the present invention to produce such three alternative modes through using moderate, and therefore inexpensive hardware outlays, in a DC-DC voltage-switching converter regulator device.

According to the present invention, a converter regulator device includes first switch elements connected in series, wherein one terminal of the first switch elements is connected to an input voltage. A medial tap between the first switch elements is connected to an inductor, the other side of which is connected to a medial tap between second switch elements which are connected in series. One terminal of the series connected second switch elements is connected to an output. The converter regulator device outputs a negligible output current when a driving voltage is below a first threshold voltage, outputs a Buck-Mode flat current level through alternating and mutually opposing conducting states of the first switch elements in a Buck-Mode under control of a driving voltage above a second threshold voltage, and outputs a Boost-Mode flat current level that is substantially lower than said Buck-Mode current level through driving, through the inductor, the medial tap between the second switch elements in a Boost-Mode under control of a driving voltage between said first and second thresholds.

According to one embodiment of the present invention, the first switch elements of the converter regulator device represent a serial resistance in the Boost-Mode through a conducting state of one of the first switch elements.

According to another embodiment of the present invention, the second switch elements of the converter regulator device represent a serial resistance in the Buck-Mode through a conducting state of one of the second switch elements.

The output terminal of the converter regulator device may be connected to a internal feedback facility to sense the output voltage.

All of the switch elements of the first and second switch elements may be substantially identical.

The driving input terminal may be fed from an input voltage power source across a first smoothing capacitor.

The output terminal may be connected to ground by a second smoothing capacitor.

For use of the converter regulator device as a Buck driver, the external inductor may be directly connected to the output terminal which disables the second serialized switch elements.

The converter regulator device may further comprise an Alarm function, a Reset function, and/or a clock modulator.

The converter regulator device may also include a slew-rate limiting functionality for limiting the slew-rate of the internal switching elements.

The converter regulator device according to the present invention may include a switchable Output with a switching-on limiting functionality to avoid a voltage drop of the regulator to prevent a possible reset.

The converter regulator device may include pins connected to an external regulator inductor, the pins being physically arranged such that no plane is encompassed by current-carrying connections attached to said external inductor means, for thereby reducing electromagnetic interference (EMI) effects.

The converter regulator device may comprise a clock modulator that applies a triangular modulated operating frequency function.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 8 is a schematic diagram of a supervisory circuit which can be used with the converter regulator device;

Figure 5:
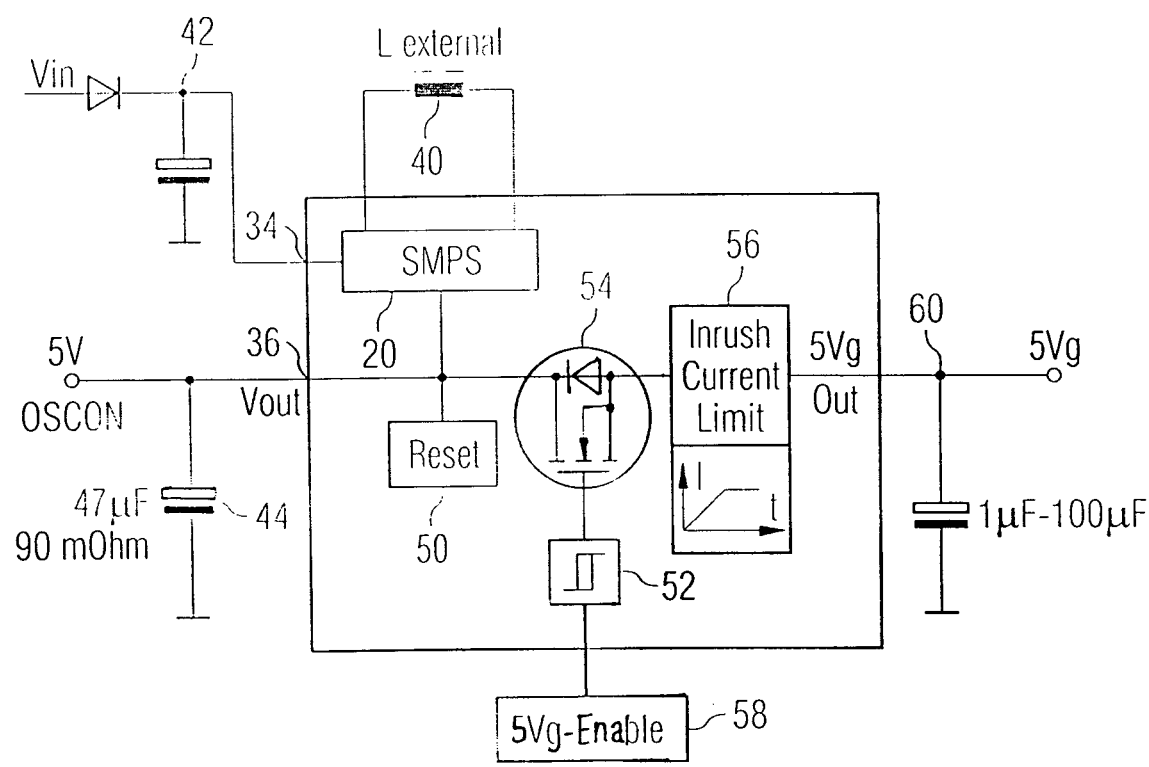
FIG. 5 is a schematic diagram of a circuit including the converter regulator of FIG. 1, the circuit being operated as a 5 volt switch.

Table 1 lists electrical supply data for various electrical parameters of the converter regulator device;

Table 2 lists electrical parameters for the 5V output switch of FIG. 5;

Table 3 lists the electrical parameters for enable data parameters;

Table 4 lists the electrical parameters for reset data parameters; and

Table 5 lists the electrical parameters for alarm data parameters.

DETAILED DESCRIPTION OF THE PRESENTLY PREFERRED EMBODIMENTS

In the following description, well known circuits have been shown in block diagram form such that the present invention is not obscured in unnecessary detail. For the most part, details concerning timing and processing considerations and the like have been omitted inasmuch as such details are not necessary to obtain a complete understanding of the present invention and are within the skill of persons of ordinary skill in the relevant art.

Reference will now be made to the drawings, wherein depicted elements are not necessarily shown to scale and wherein like or similar elements are designated by the same reference numeral through the several views.

The following features and advantages have been realized with the embodiments described herein. The device is operational in a wide range of driver voltages between 2 volts (the first threshold voltage) and 42 volts (input voltages from 3 volts up). In particular, it would stay operational even under the disturbance generated by a Volkswagen Start Pulse. The output voltage is 5 volts ±2%. The average output current for a driver voltage >5 volts is 600 mAmps (minimum requirement), and the average output current for a driver voltage in the range 2–5 volts is 200 mAmps (minimum requirement). The actual mode depends on the input voltage (Buck-Mode vs. Boost-Mode). The device provides a burst-mode for low quiescent current. The device features internal alarm and reset facilities. The inductor means necessary are represented by only a small single, simple inductor. The device features synchronous rectification, which is disabled at lower output currents. Then the internal transistor diode takes on the current. The device features an electromagnetic interference (EMI)-optimized clock-modulator and slew rate control. The device features a switched 5 volts output (5 Vg) with inrush current limitation. The 5 Vg-switch is preferably switching as fast as possible without causing a voltage drop of Vout below the reset threshold.

Particular advantages are as follows. The device provides an output voltage of 5 volts during the complete Volkswagen start pulse which is illustrated, for example, in FIG. 6B. The internal synchronous rectification will in spite of different operating modes reduce the necessary amount of external electrical components and thereby improve efficiency. An internal voltage divider for adjusting the 5 volts output will reduce the number of necessary external electrical components. The continuous, low ripple output current at normal operation condition (Buck-mode) will simplify design of the output filter. The Buck-Mode and Boost-Mode are effected through using only a single simple inductor. An EMI-optimized analog clock modulator and a scalable slew-rate control will reduce the amount of external bypass capacitors and filters. An additional 5 volts switch (5 Vg) provided with an inrush current (or output voltage drop-) limiting facility will support switching off various external circuits for lower current consumption.

Figure 1:
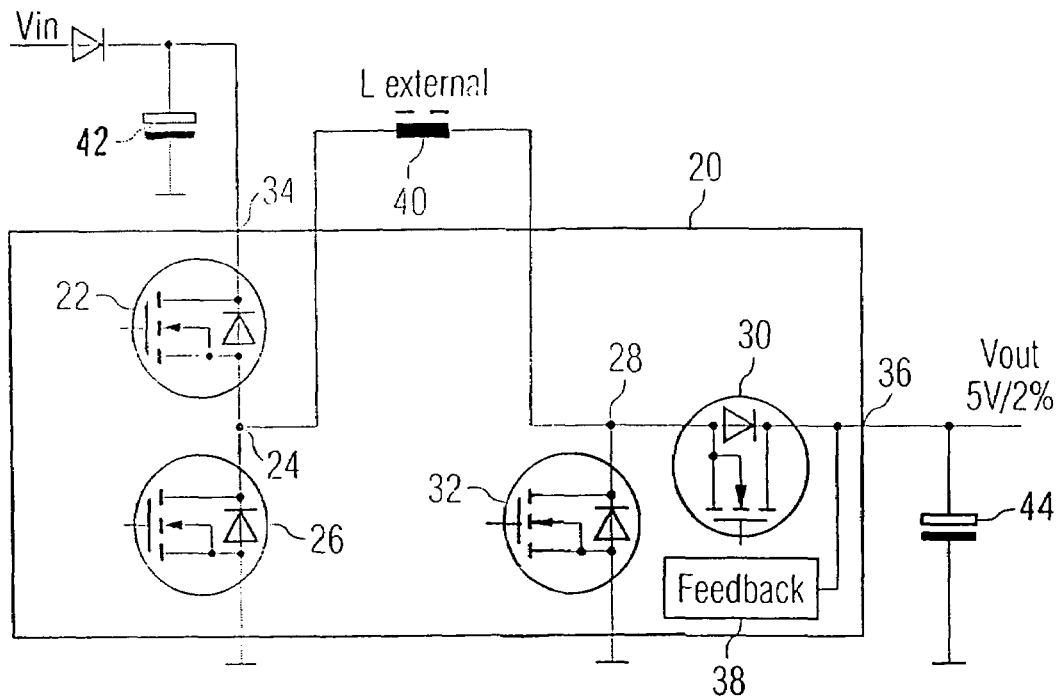
FIG. 1 is a schematic diagram showing a DC-DC voltage-switching converter regulator device according to the present invention.

FIG. 1 illustrates an overall arrangement of a DC-DC voltage-switching converter regulator device according to the invention. The circuit core 20 comprises two first switch elements 22, 26 connected in series. A first terminal of the two serially connected first switch elements 22, 26 is fed by a driver voltage at terminal 34 and a second terminal connects to ground. A medial tap 24 between the two first switch elements 22, 26 is connected to one terminal of an external inductor 40. The other terminal of the inductor 40 is connected to a medial tap 28 between second switch elements 30, 32 which are also connected in series. One terminal of the second switch elements 30, 32 is connected to an output 36 of the device, whereas the other terminal thereof connects to ground. Output 36 is further connected to a feedback facility 38.

Driver voltage is provided by an external power voltage Vin, that has a smoothing capacitor 42 crossed over to ground. The smoothing capacitor is considered as optional only. Likewise output 36 has a smoothing capacitor crossed over to ground. Conducting and blocking states of the various switches are controlled by a clock source which is not shown in FIG. 1. Through external synchronization, switches 22 and 32 operate in synchronism, just as switches 26 and 30 operate in synchronism, the two pairs operating in opposition.

Figure 2:
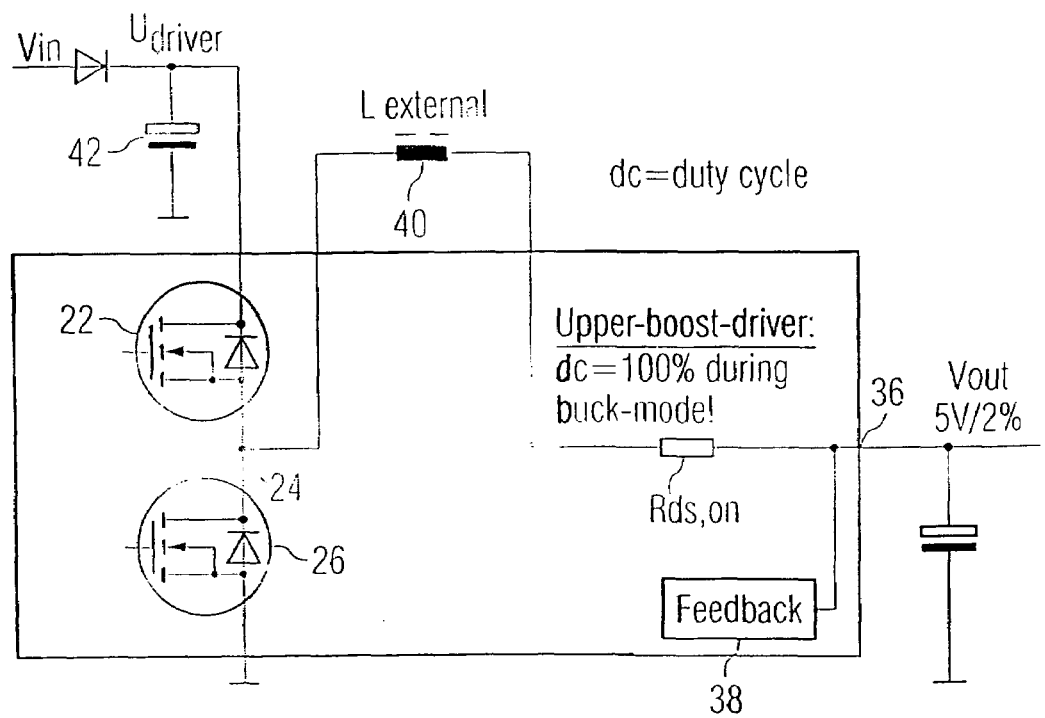
FIG. 2 is a schematic diagram showing the converter regulator device of FIG. 1 in the Buck-Mode.

FIG. 2 illustrates the usage of the circuit of FIG. 1 in Buck-Mode, when the driver voltage is above approximately 5 Volts (in practice 5.4V–5.6V). In that case, the upper Boost-driver switch element 30 has a 100% duty conductivity cycle, and will represent only the low conducting resistance of the switch in question. The output voltage is as shown. The remainder of the arrangement is as has been described with reference to FIG. 1.

Figure 3:
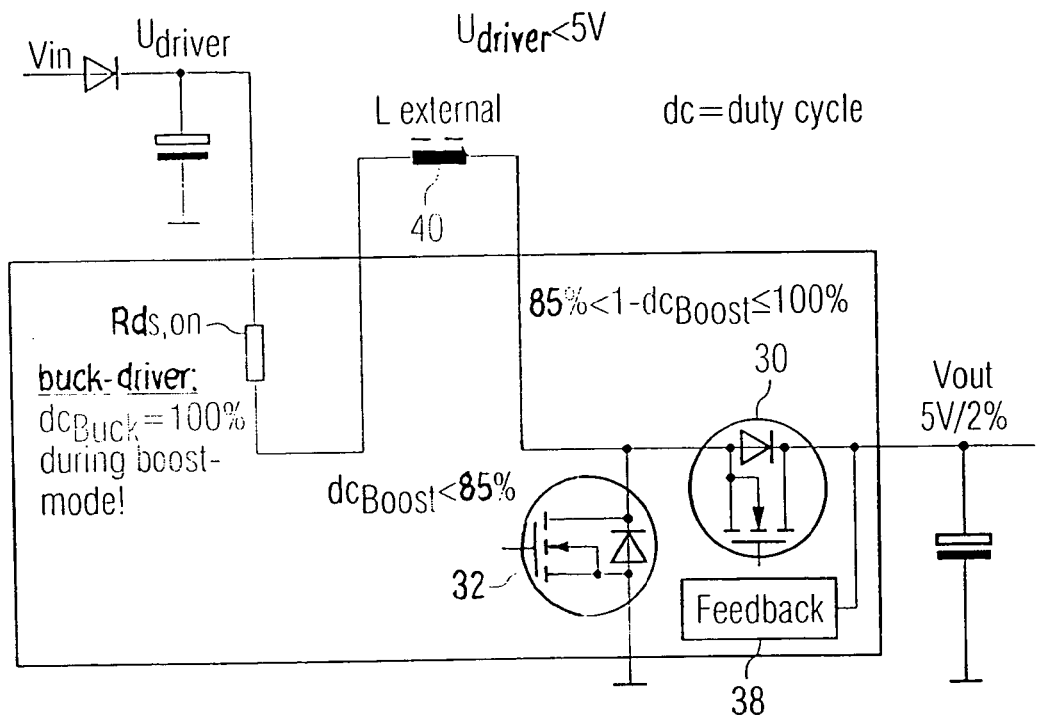
FIG. 3 is a schematic diagram showing the converter regulator device of FIG. 1 in the Boost-Mode.

FIG. 3 illustrates the usage of the circuit of FIG. 1 in Boost-Mode, in particular, when the driver voltage is below approximately 5 Volts (in practice 5.4V–5.6V). Now, the duty cycle of the upper Buck driver switch element 22 is 100%, and this switch would represent only the low conducting state resistance. The lower Boost-Mode switch element 32 has a duty cycle of less than 85%. For the upper Boost-Mode switch element 30, the following applies: $85\% < 1 - dc_{Boost} \leq 100\%$.

Figure 4:
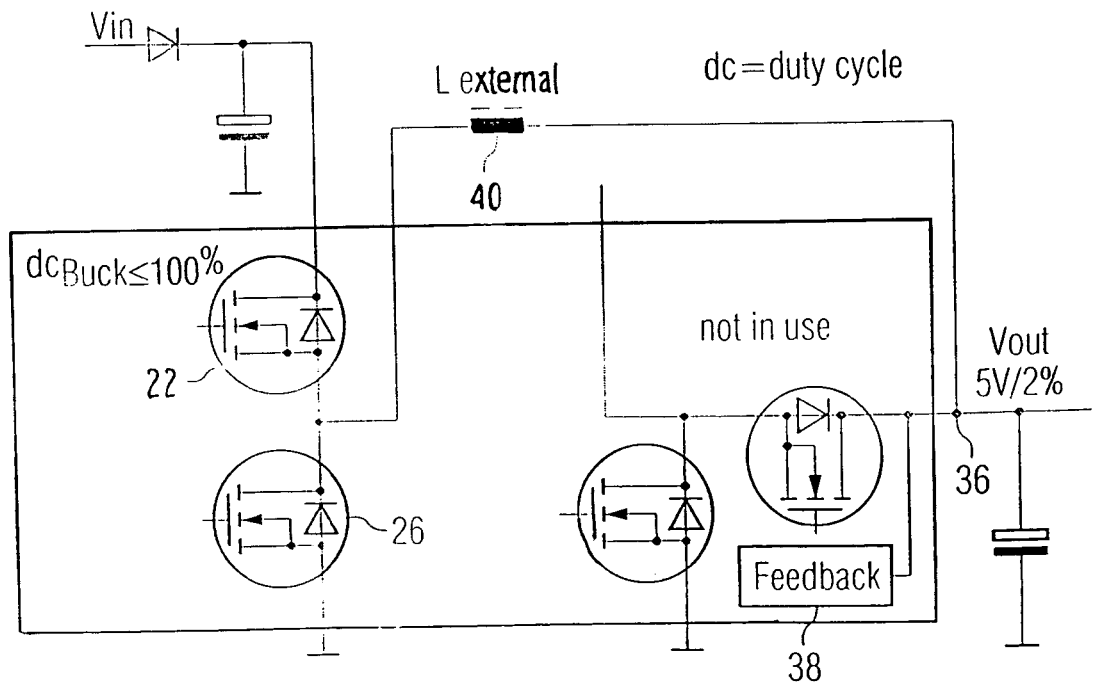
FIG. 4 is a schematic diagram shown a converter regulator device for used as a Buck-Mode driver.

FIG. 4 illustrates an amendment to the setup of FIG. 1 for use as a Buck driver. Here, the right hand terminal of the external inductor 40 has been connected directly to terminal 36, such that switch elements 30, 32 are effectively not used. The duty cycle of upper Buck-Mode switch element 22 is now less than 100%, where it was equal to 100% in the set up of FIG. 3.

FIG. 5 illustrates an arrangement of the above amended for use as a 5 volts switch. The core circuit 20 and further elements 34, 36, 40, 42, 44 correspond to those of FIG. 1. The smoothing capacitor 44 has been chosen as 47 uF and 90 mOhm. At these worst case values a minimum capacitance of Vout and maximum capacitance of 5 Vg-out is being obtained, causing during switching on the deepest voltage drop of Vout. At the right hand side of FIG. 5, a reset facility 50 is added. In addition, an added switch 54 that is of similar construction as earlier switches, is coupled in series between terminal 36 and a terminal 60 far right. Through a hysteresis-controlling element 52 which is controlled by a 5 Vg Enable signal, an inrush current limiting function 56 is effected, wherein slope $\partial I/\partial t$ is limited as shown. Output terminal 60 now has an in-rush-limited current and is provided with a capacitor in the range 0–150 μF, especially 1 μF–100 μF.

Figure 6A:
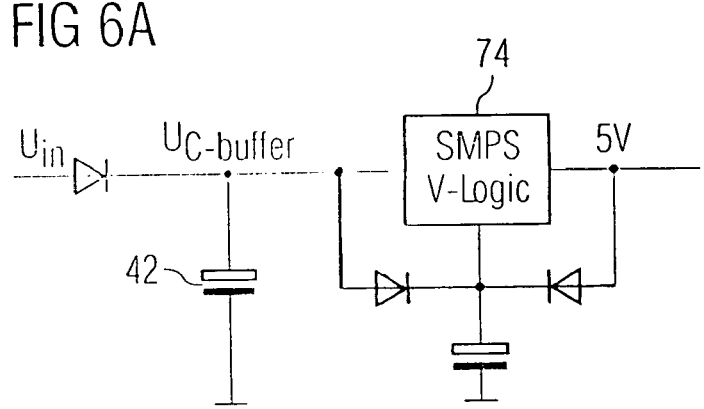
FIG. 6a is a schematic diagram showing operation of the circuit of FIG. 5 during a start pulse.
Figure 6B:
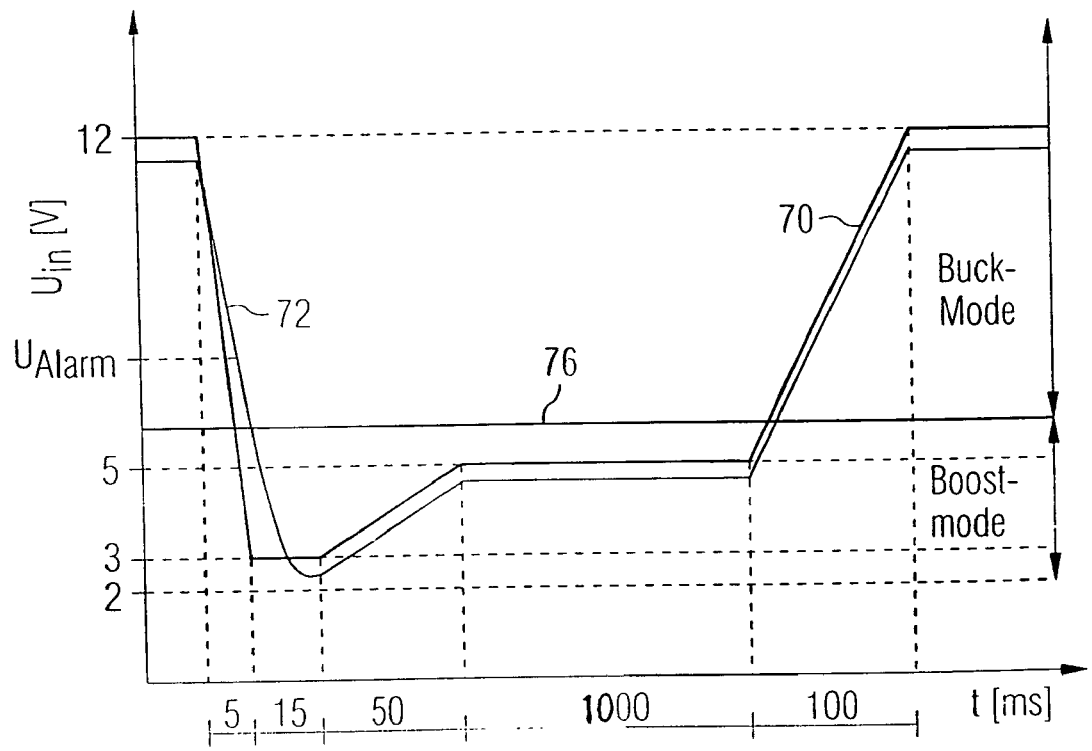
FIG. 6b is graph showing the input driver voltage of the circuit of FIG. 6a over time during a start pulse.

FIG. 6b illustrates the behavior of the arrangement shown in FIG. 6a during a start pulse, such as the Volkswagen start pulse considered above and indicated by numeral 70. Here, the initial source voltage is 12 volts, as is usual in an automotive environment. Within a few milliseconds, the starting operation of the engine lets this voltage drop to about. 3 volts only, where it remains some 15 msecs. Subsequently, it will recover to 5 volts, stay there for an appreciable time such as in the order of 1 sec, and subsequently resume its original value in some 100 msec. The voltage derived from the source voltage, $U_{C\text{-}buffer}=U_{driver}$ 72 at the smoothing capacitor 42 (see FIG. 1), is generally lower than curve 70 by 1 volt, except during the steep falling edge of voltage 70. The edge of $U_{driver}$ or slew rate may depend on various circuit characteristics, so that its slope could be somewhat less steep than actually shown.

The electronic circuit may be represented by FIG. 6a, to have the switched mode power supply (SMPS) logic 74, bridged by two internal mutually opposed rectifiers that via a capacitor connect to ground. As shown the overall operation changes from Buck-Mode to Boost-Mode below line 76 at some 6 volts, but never goes below the first threshold at 2 volts.

Figure 7A:
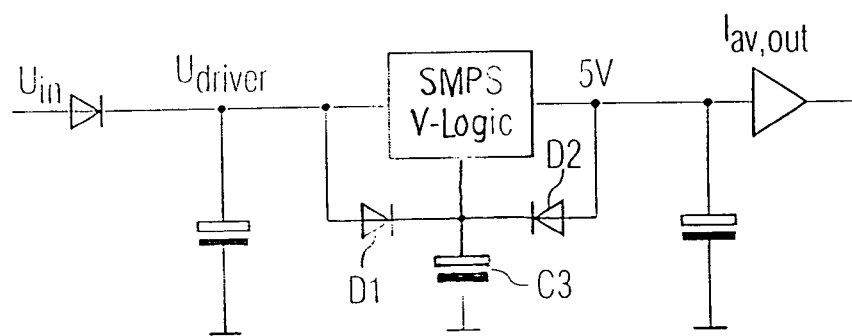
FIG. 7a is a schematic diagram showing the operation of the circuit of FIG. 5 as a minimum current supply facility.
Figure 7B:
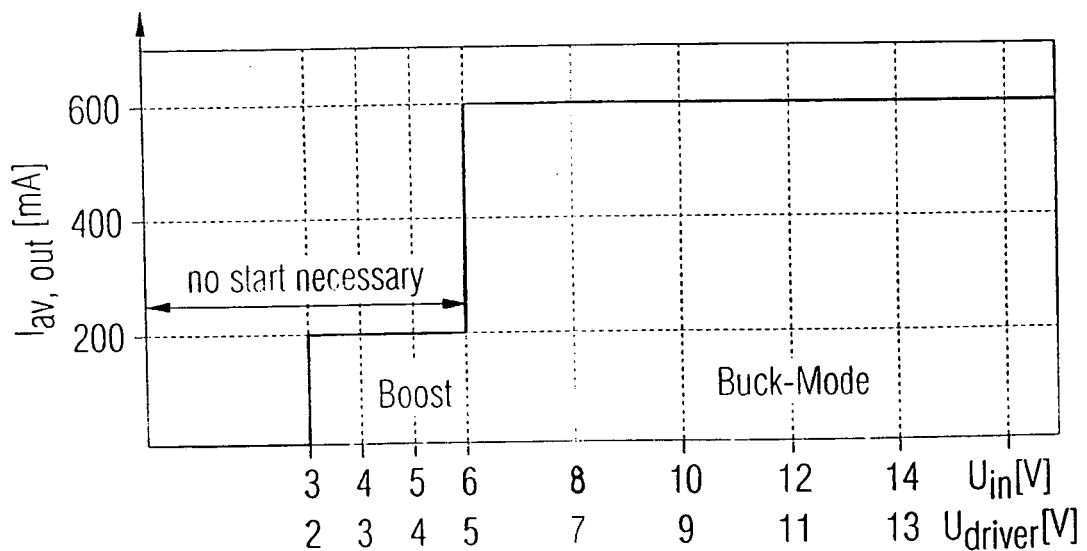
FIG. 7b is a graph showing the output current of the circuit of FIG. 7a at different input driver voltages.

FIG. 7b illustrates the characteristic curve of the minimum provided output current versus input voltage of the circuit. The circuit has been represented once again in FIG. 7a, and the current levels have been shown as a function of the input and driver voltages, respectively. Here, the second voltage is generally lower by an amount of 1 volt. Below a lower threshold, the output current is negligible, say at most a few milliamps. When driver voltage rises, the current quickly goes to a substantially flat Boost-Mode value of some 200 mAmps. When driver voltage rises above some 5 volts, the current quickly goes to a substantially flat Buck-Mode value of some 600 mAmps. As long as the voltage is not much higher (say, a fraction of 1 volt) than about 5 volts, the Boost-Mode gradually changes to Buck-Mode. Below the second threshold, no starting of the device is necessary. The flatness of the current levels will generally be in the same range of percentage as the variation indicated for the output voltage.

FIG. 8 illustrates an arrangement of a supervisory circuit for producing alarm and reset signals. An input 80 carries a signal level that could cause alarm conditions. The reset threshold is not dependent on the input 80 Alarm-Sense-Voltage signal level, but only on output voltage, sensed by an internal resistive voltage divider having a terminal 88. Comparison with reference voltage source 82 in hysteresis amplifier 84 may control transistor 92 to produce an alarm output signal on its terminal. Similarly, comparison of the output voltage $V_{out}$ at said internal voltage divider terminal 88 with the reference 82 in hysteresis amplifier 86 may via a delay facility 90, for a minimum reset time defined by external capacitor Cext, control transistor 94 to produce a reset output signal at its terminal.

Figure 9:
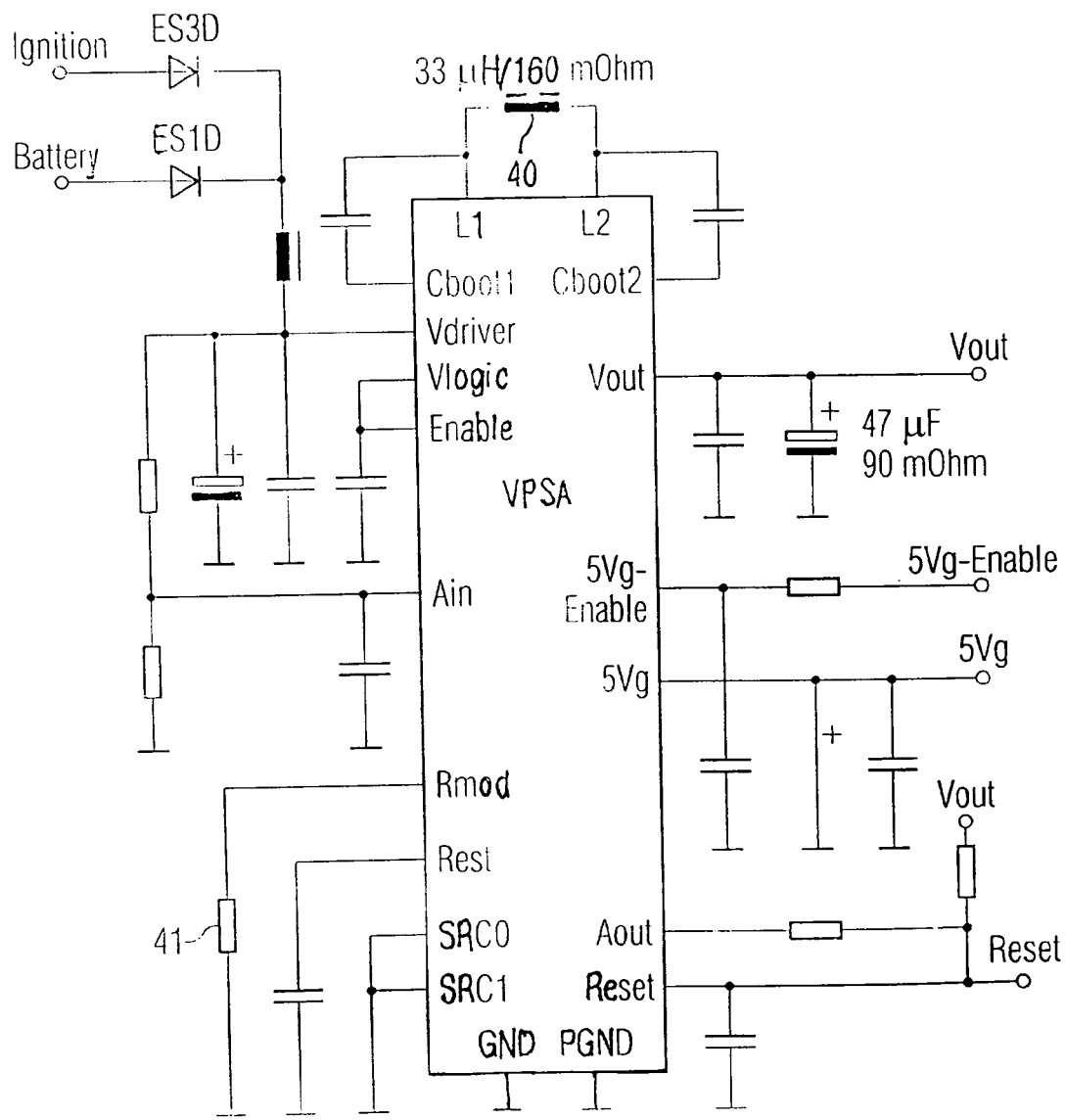
FIG. 9 is a schematic diagram depicting a first package arrangement of the converter regulator device.
Figure 11:
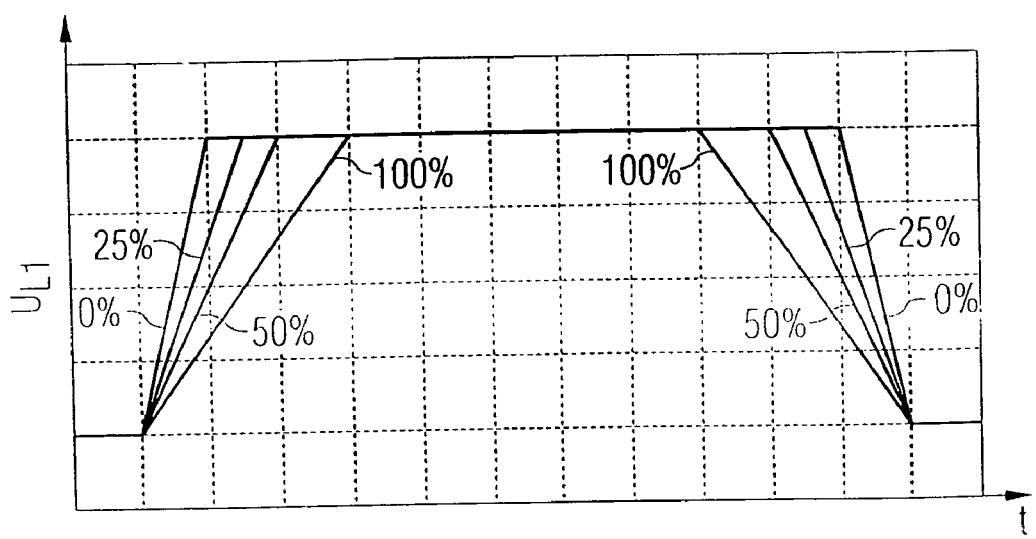
FIG. 11 is a graph showing the voltage at an inductor terminal L1 over time for depicting various operating modes of slew rate control.

FIG. 9 illustrates a first package arrangement for the DC-DC voltage-switching converter regulator device of the present invention, which is identified in FIG. 9 as VPSA, being provided with various external circuit elements. The functional pins are as follows:

1. In operation, pins L1, L2 connect to an external regulator inductor 40, at 33 uH and 160 mOhm. Notably, the physical arrangement of these two pins is such that no plane will be encompassed by the current-carrying connections between inductor 20 and the VPSA, thereby reducing EMI effects.
2. The pin Vdriver receives the powering for the power converting part of the VPSA.
3. The pin Vlogic receives internally in the package VPSA the powering for all elements except for the power converting part. To this effect, pins Vdriver and Vlogic are internally decoupled by a diode not shown that allows loading of the buffer capacitor of Vlogic. Furthermore, a second internal diode not shown is used to feed Vlogic with the output voltage. This self-holding facility allows to use the regulator in the powering range Udriver >2 volts without restriction of the Boost functionality, because the circuitry power is derived from the 5 volts output.
4. The alarm pin Ain allows the setting of a discrimination voltage at which a Powergood signal is forcibly generated. The threshold proper is set through external resistors to get a typical alarm at Vbat=8 volts, before the input diode, which terminates with a 500 mV hysteresis at Vbat=8.5 volts. Note that the voltage divider sits behind the input diode.
5. The alarm pin Aout is necessary for putting the system into an expectation state, which prevents the unwanted breakdown of the power supply. Electrically, this may be realized by an open-drain or by an open collector output. The various required output levels are recited in Table 5.
6. The configuration pin REST is used to determine the reset time of the microcontroller. The actual resetting needs a minimum interval between 1–100 msec. The time window is adjusted through a capacitance in a range between 1–100 nF.
7. The pin Reset is used with an open collector output to drive the microcontroller to reset. The power-on reset functionality is enabled after attaining the Vout supply level, to ensure that the microcontroller can only be reset in the allowed voltage interval.
8. The Vout function pin is used for outputting a regulated 5 volts supply. The remaining pins are largely standard.
9. The pins SCR0,1 control the relative steepnesses of the switching transistor or slew rate values, as shown in FIG. 11. For SCR(0,1)=(0,0), (0,1), (1,0), and (1,1) the controlled relative steepnesses for $SR_{T1}$ in the Buck-Mode are 100%, 50%, 25%, and 0%, respectively. The relative steepnesses for $SR_{T1}$ in the Buck-Boost-Mode are 100%, 100%, 50% and 50%, respectively. The difference between maximum and minimum values for SR is considered as 100%.
10 The function pin Rmod determines the clock modulator frequency. A value of 12 k4 Ohm resistance (41) results in a modulation frequency of 28 kHz.
11. Pin PGND is power ground for the driver's earth potential.

12 Pin Enable allows enabling/disabling of the switched regulator. This pin is compatible to the signal "Inhibit" supported by the low-speed CAN Transceiver TJA1054 that is well-known in the art of automotive data processing. In consequence, this pin allows switch-on of the regulator. In particular, logic 1 renders the circuit active, whereas logic 0 and open represent "not-active".

13. Pin 5 Vg carries a 5 volt output. This voltage is provided via a switch-on current limiter, for avoiding a reset that could follow from a voltage breakdown at power up via a capacitive load. In particular, logic 1 renders the circuit active, whereas logic 0 and open collector represent "not-active".

14. Pins Cboot1/2 connect external bootstrap capacity for the high-side input Mosfet T1.

15 Pin Csoftstart/test connects an external capacitor for the function Softstart. However, this function is preferably moved to the internal circuitry, which removes the need for an external C. This allows for adding a new function: low power detection for Iout<10–45 mA, requiring an external capacitor.

Figure 10:
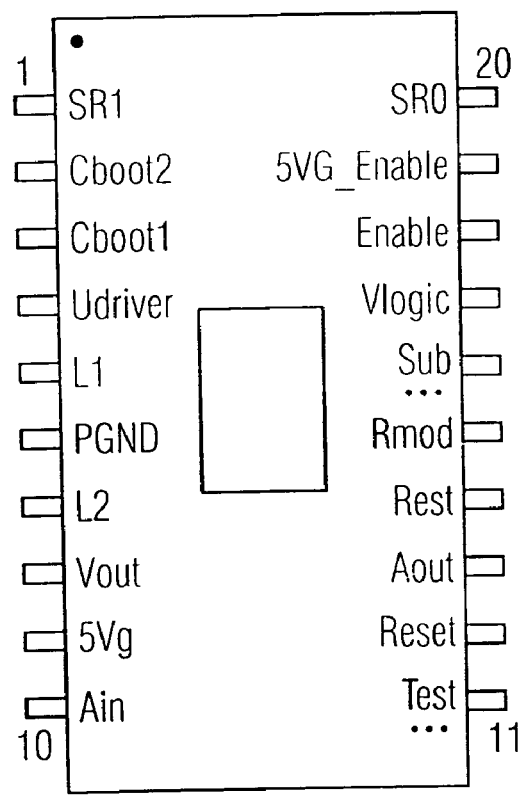
FIG. 10 is a schematic diagram depicting a second package arrangement of the converter regulator device.

FIG. 10 illustrates a second preferred package arrangement for the DC-DC voltage-switching converter regulator device of FIG. 9, but without various external circuit elements provided. In addition to the pins shown in FIG. 9, the second package arrangement in FIG. 10 include the pins TEST for executing a test function for the convenience of the chip manufacturer. The pins GND and PGND of FIG. 9 have been combined in this arrangement to a single pin.

For electromagnetic interference (EMI) compatibility, the system comprises a clock modulator facility. This allows a frequency modulation of the switching regulator which, in its turn, allows distribution of interference in the frequency band. First, the frequency change is $\Delta F = \frac{1}{2} * (f_2 - f_1)$. The modulation rate or factor is: $m = \Delta F / f_T$. A function $f_{(t)}$ allows a time-dependent modulation degree to be described, according to $m_{(t)} = m * f_{(t)}$. The modulated switching frequency is described by $f_{SC(t)} = f_T + (f_T * m_{(t)})$. Therefore, the time-dependent modulation degree $m_{(t)}$ allows the switching frequency of the regulator to be changed. The modulated switching frequency can be written as: $f_{SC(t)} = f_T + (f_T * m * f_{(t)})$. This can be simplified to: $f_{SC(t)} = f_T(\Delta F * f_{(t)})$. The sign of the frequency shift is embodied by the modulation frequency $f_{(t)}$.

Figure 12:
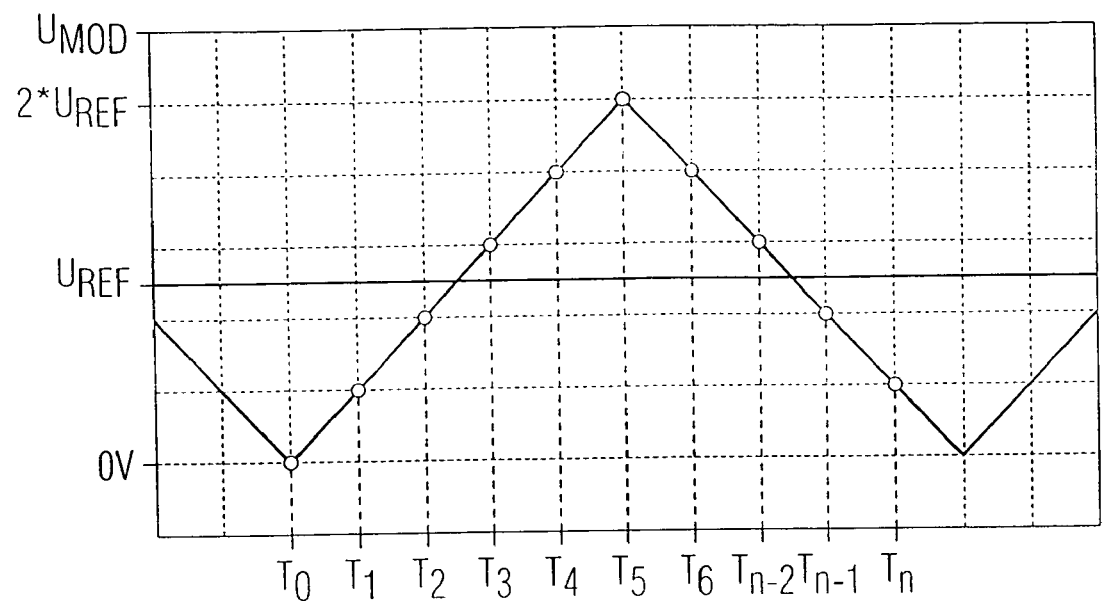
FIG. 12 is a graph depicting the function of a clock modulator according to the present invention.

FIG. 12 illustrates the function of the clock modulator. Of course, other realizations may be feasible as well. Advantageously, the modulator uses a triangle function as shown, divided over n time segments. The triangle function is as follows:

For $0 \leq t \leq T/2$ $f_{(t)} = (4U_{REF}/T) * t - U_{REF}$

For $T/2 \leq t \leq T$ $f_{(t)} = -(4U_{REF}/T) * (2t-T)/2 + U_{REF}$.

This gives a switching frequency $f_{SC(t)}$ according to:

$f_T + f_T * m * U_{REF} * (4t/T-1)$, and $f_T + f_T * m * U_{REF} * \{(2T-4t)/T+1\}$, respectively.

Capacitor $C_{MOD}$ is discharged through a current drain and charged through a current source. The charging and discharging are controlled by the "control unit". If the voltage $U_C$ reaches 0 volts, the current source will be enabled, and if $U_C$ exceeds $U_{REF}$ twice, the current drain will be enabled to discharge the capacitor again. The switching frequency $f_{SC(t)}$ is modulated between $U_C$ and $U_{REF}$. A frequency generator generates the carrier frequency $f_T$, which is needed for control and synchronization purposes. The division of the carrier frequency by 10: $f_T/10$ is the lower limit.

Figure 13:
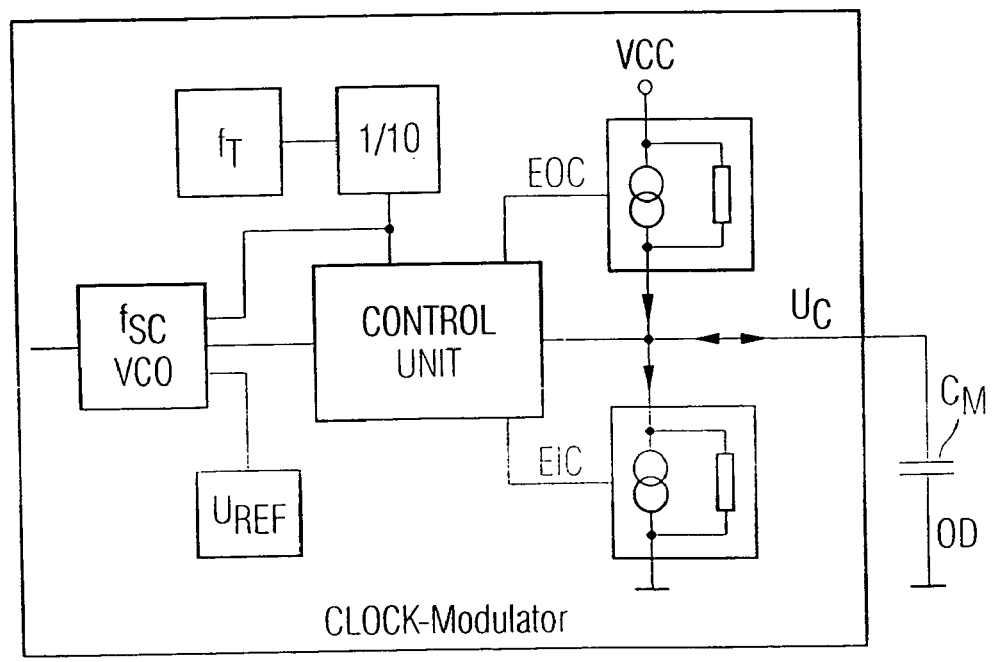
FIG. 13 is a schematic diagram of a clock modulator which may be used with the converter regulator device of the present invention.

The clock modulator is shown in FIG. 13. Instead of an external capacitor $C_M$, an external resistor may be used for adjusting the clock modulator. With a fixed modulation depth, the switching frequency varies continuously in the specified range.

In general, the clock regulator may be used as "step-up", "step-down", or as "step-up/step-down" regulator. The mode switches automatically with the input voltage $V_{DRIVER}$ to keep the output voltage $V_{OUT}$ constant. To minimize the number of external components, all modes work as synchronous rectifier.

In Buck-Mode, the duty cycle of the transistor T1 ($DC_{T1}$) sets the voltage $V_{OUT}$. The duty cycle of transistor T1 (22) is adjustable between 0 and 1, to provide both Boost-Mode and Buck-/Boost-Mode. The duty cycle for T1 in Buck-Mode is $0 < DC_{T1} \leq 1$. The control logic enables a reduction of the internal power dissipation by the control transistor T2 (26). The duty cycle $DC_{T2}$ results immediately from the duty cycle $DC_{T1}$:

$DC_{T2} = 1 - DC_{T1}$. To avoid current loss, simultaneous switching-on of these two transistors must be avoided. With respect to the turn-on and turn-off times of the switching transistors, the duty cycles will be as follows: $0 < DC_{T1} \leq 1 - DC_{T2OFF}$;

$$DC_{T2} = 1 - DC_{T1} - DC_{T1OFF}.$$

For Buck-Mode, transistor T3 (32) is not necessary, and is switched off. The duty cycle of transistor T3 is: $DC_{T3} = 0$. Transistor T4 (30) is switched on to reduce power dissipation. The duty cycle of transistor T4 is $DC_{T4} = 1 - DC_{T3} = 1$. The switching timings of transistors T3 and T4 are not considered because in Buck-Mode the logical control of the transistors is uniform in time. FIG. 4 shows a configuration not using the transistor 30 to avoid internal power dissipation. This should not affect Buck-Mode functionality.

If the input voltage VDRIVER is below 5 volts, the Buck-Mode will be disabled. The Boost-Mode however, is enabled in the voltage range between 2 volts and approximately 5.6 volts, to ensure a 5 volts output voltage. The duty cycle $DC_{T3}$ of transistor T3 in Boost-mode sets the output voltage $V_{OUT}$. The duty cycle of $DC_{T3}$ must be adjustable between: $0 < DC_{T3} < 0.7$. To reduce power dissipation, the control logic enables the switching-on of transistor T4. The duty cycle of transistor T4 is $DC_{T4} = 1 - DC_{T3}$. To avoid discharging of the buffer capacitor, the simultaneous switching on of both transistors T3 and T4 must be prevented. With respect to the turn-on and turn-off times and the foregoing equations, the respective duty cycles are:

$$0 < DC_{T3} 0 < 1 - DC_{T4OFF}; DC_{T4} = 1 - DC_{T3} - DC_{T3OFF}$$

Transistor T1 is always switched on. For Boost-Mode, transistor T2 is not required, and may have a duty cycle equal to zero. The timing of switching transistors T1, T2 is irrelevant in Boost-Mode, because their logical control is time-independent. The transition voltage between Boost-Mode and Buck-Mode may lie in a input voltage range from 5.5 to 6 volts. The logic will automatically select the appropriate one of Boost-Mode and Buck-Mode, such as would apply during the transitions of FIG. 6b. During the actual transition, no oscillation of the output voltage may occur, nor an AC component superposed on the DC voltage.

The functionality of the regulator, even at low voltages of the input supply, is ensured by an internal diode D2 (FIG. 7a) to provide a stable logic voltage during input transients, through capacitor C3. An internal diode D1 is used for startup. If here a transistor is used instead of a diode, that transistor can be switched off upon Vout reaching 5 volts.

The diode D2, also being referred to as second internal diode D2 (FIG. 7a), derives a logic control voltage V-Logic from the output voltage. If $V_{DRIVER}$-supply is $U_{DRIVER}$=5 volts for $T_{INIT}$>3 ms, then the regulator must ensure a stable 5 volts output voltage, with the load current in the specified range. After $T_{INIT}$ the logic will be supplied through diode D2. The voltage $V_{DRIVER}$ can then be reduced to 2 volts.

Now, the present invention has hereabove been disclosed with reference to preferred embodiments thereof. Persons skilled in the art will recognize that numerous modifications and changes may be made thereto without exceeding the scope of the appended Claims. In consequence, the embodiments should be considered as being illustrative, and no restriction should be construed from those embodiments, other than as has been recited in the Claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A DC-DC voltage-switching converter regulator device for supplying power to various components in an automotive application, comprising:
   a driving input terminal for receiving electric power;
   a pair of first switch elements connected in series and receiving input power from said driving input terminal, a first medial tap arranged between said pair of first switch elements;
   an external inductor having a first inductor terminal connected to said first medial tap and a second inductor terminal;
   a pair of second switch elements connected in series and having a terminal tap connected to a power output terminal, a second medial tap arranged between said pair of second switch elements and connected to said second inductor terminal; and
   a further switch element connected to said power output terminal and providing an output with an inrush limited current,
   said converter regulator device
   outputting a negligible output current under control of a driving voltage below a first threshold voltage,
   outputting a Buck-Mode flat current level through alternating and mutually opposing conducting states of said pair of first switch elements in a Buck-Mode under control of a driving voltage above a second threshold voltage, and
   outputting a Boost-Mode flat current level that is substantially lower than said Buck-Mode current level through driving, by the inductor, the medial tap of said pair of second switch elements in a Boost-Mode under control of a driving voltage between said first and second thresholds.

2. The converter regulator device of claim 1, wherein said first switch elements represent a serial resistance through a conducting state of one of said first switch elements in said Boost-Mode.

3. The converter regulator device of claim 1, wherein said second serialized switch elements represent a serial resistance through a conducting state of one of said second switch elements in said Buck-Mode.

4. The converter regulator device of claim 1, further comprising a feedback facility connected to said power output terminal of said converter, said feedback facility having an internal resistive voltage divider for output voltage sensing.

5. The converter regulator device of claim 1, wherein each of said first and second switch elements is substantially identical to the others of said first and second switch elements.

6. The converter regulator device of claim 5, further comprising means for providing an edge-limiting functionality for the slew rate of said first switch elements and said second switch elements.

7. The converter regulator device of claim 1, wherein said power output terminal is connected to ground by a smoothing capacitor.

8. The converter regulator device of claim 1, wherein said external inductor is directly connectable to said output terminal to disable said second switch elements for use of the converter regulator device as a Buck driver.

9. The converter regulator device of claim 1, further comprising an alarm function connected to said driving input terminal.

10. The converter regulator device of claim 9, further comprising a reset function connected to said power output terminal.

11. The converter regulator device of claim 1, further comprising a clock modulator for frequency modulation of said converter regulator device.

12. The converter regulator device of claim 11, wherein said clock modulator applies a triangular clock function.

13. The converter regulator device of claim 1, further comprising a first smoothing capacitor connected to said driving input terminal such that said driving input terminal is fed from an input voltage power source across said first smoothing capacitor.

14. The converter regulator device of claim 1, wherein said converter regulator device is arranged in a package having pins connected to said external inductor, said pins being arranged such that no two-dimensional surface plane is encompassed by current-carrying connections attached to said external inductor, for thereby reducing electromagnetic interference effects.

15. The converter regulator device of claim 1, further comprising a hysteresis controlling element connected to said further switch.

* * * * *